United States Patent [19]

Sexton

[11] 3,917,086
[45] Nov. 4, 1975

[54] COMBINED BOAT CARRYING AND CAMPING TRAILER

[76] Inventor: Robert L. Sexton, 3508 Bridge Manor Drive, Kansas City, Mo. 64137

[22] Filed: Jan. 30, 1974

[21] Appl. No.: 437,840

[52] U.S. Cl. .................. 214/84; 214/500; 296/23 B
[51] Int. Cl.² ..................... B60P 3/10; B60P 3/32
[58] Field of Search ............. 214/84, 500; 296/23 B

[56] References Cited
UNITED STATES PATENTS

| | | | |
|---|---|---|---|
| 2,942,744 | 6/1960 | Hall | 214/500 |
| 3,058,756 | 10/1962 | Holsclaw | 214/84 X |
| 3,116,949 | 1/1964 | Muse | 214/500 X |
| 3,773,195 | 11/1973 | Honea | 214/84 |
| 3,784,248 | 1/1974 | Neuman | 296/23 B |

*Primary Examiner*—Leo Friaglia
*Attorney, Agent, or Firm*—Thomas M. Scofield

[57] ABSTRACT

Improvements in dual purpose trailer constructions alternately usable for boat carrying and camping purposes; a dual purpose combined camping and boat carrying trailer having built-in but retractable living and camping equipment (beds and a table) and removable boat mounting and handling roller assemblies mountable on the trailer floor; a dual purpose camping and boat carrying trailer designed for alternate boat handling and carrying use and camping and living use with access means provided for loading and discharging the boat, reaching the boat winch during boat loading and discharge, and entering and leaving the trailer body when the former access ways are secured, when using the trailer in the camping function; dual purpose camping and boat carrying trailer dimensioned and configured so that all the basic, necessary equipment for boat handling, securing and carrying and onsite camping are incorporated in a single vehicle.

4 Claims, 13 Drawing Figures

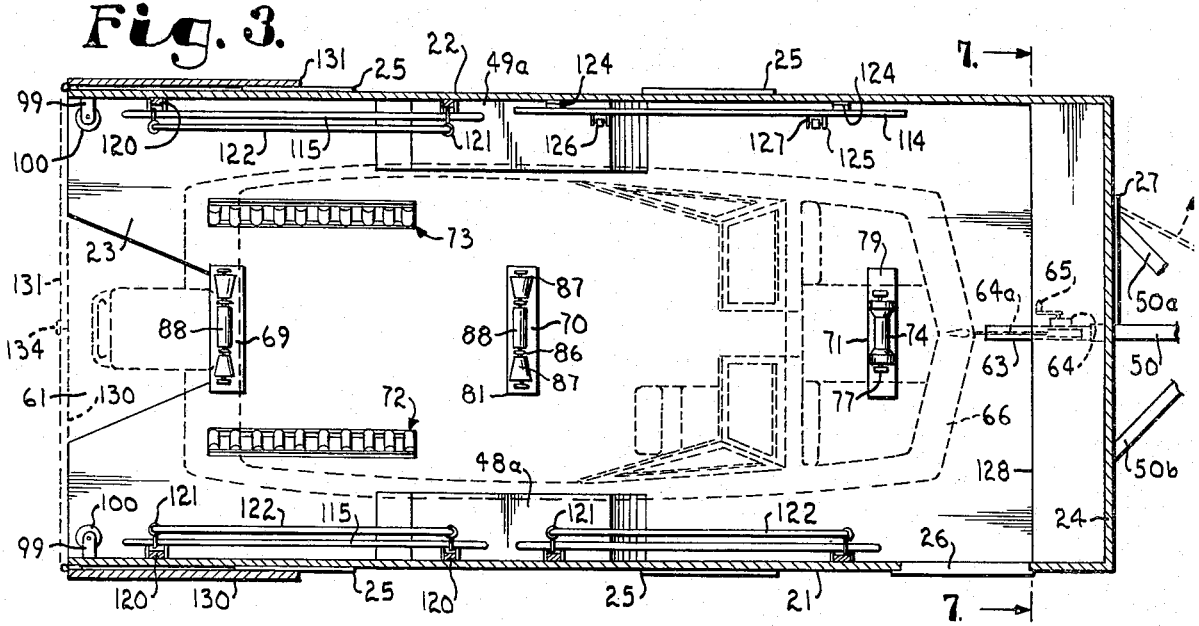
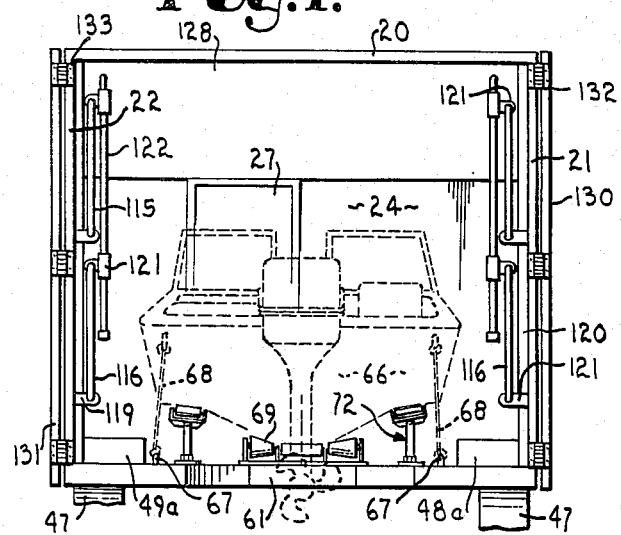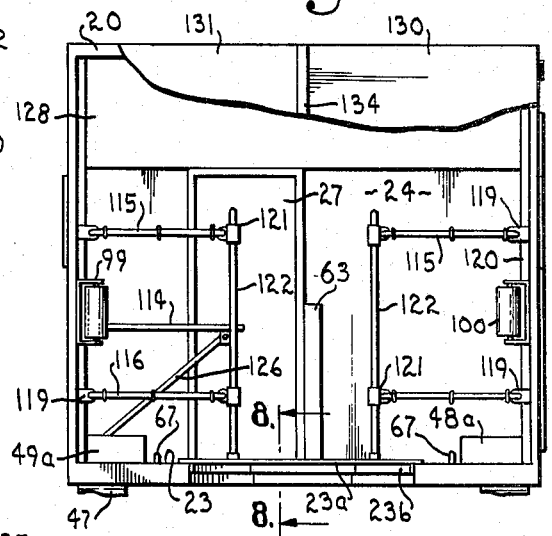
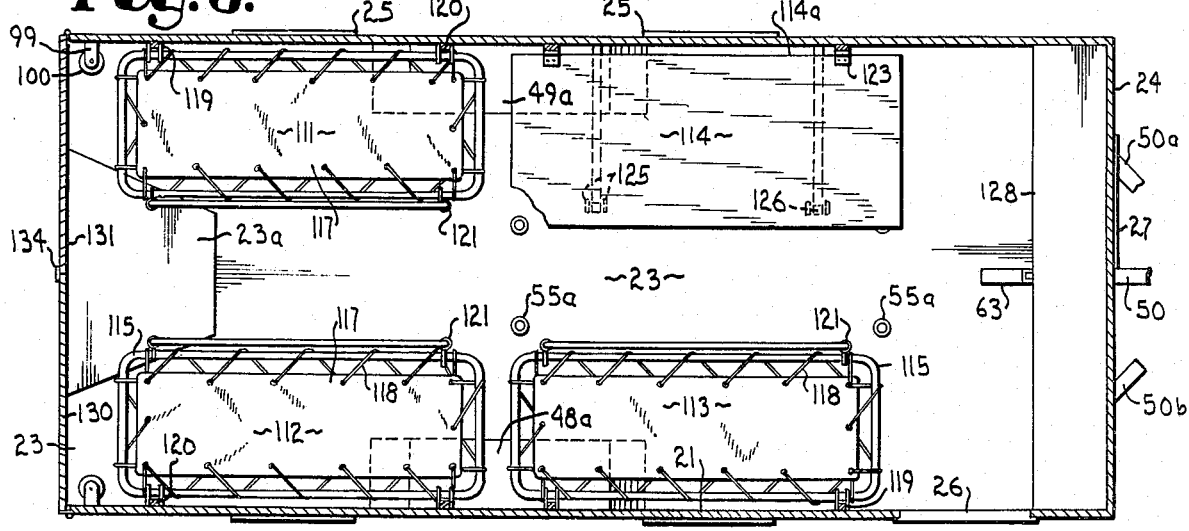

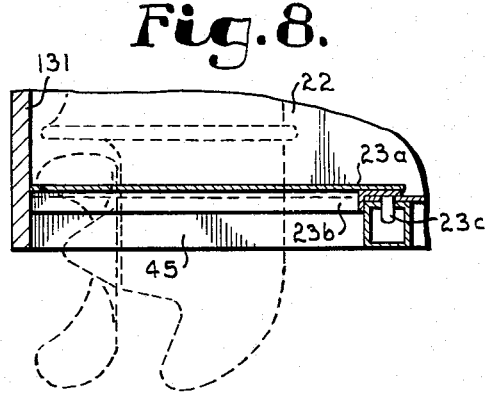
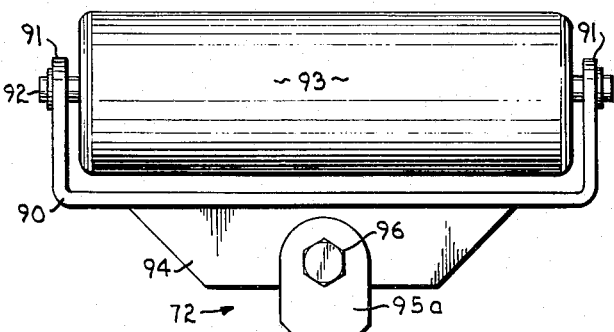
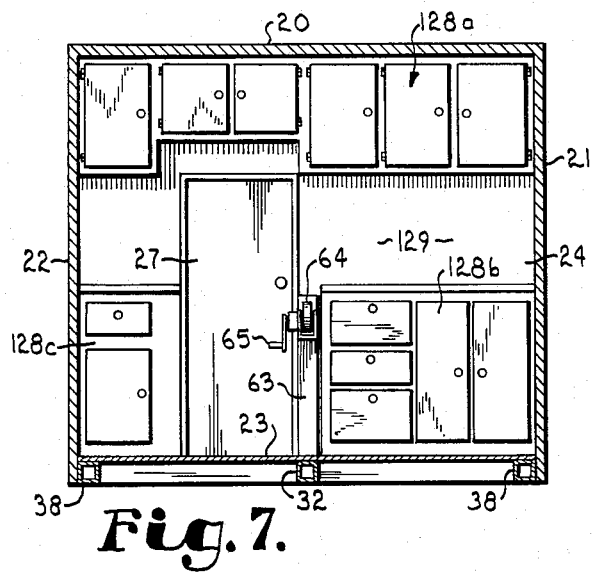
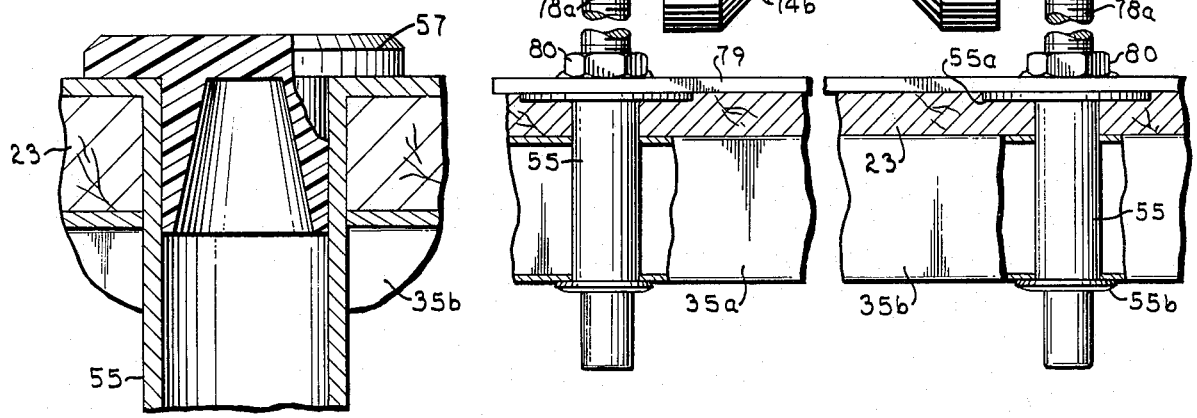

COMBINED BOAT CARRYING AND CAMPING TRAILER

PRIOR ART

I am aware of the following prior art patents directed to multi-purpose trailers:

Muse — U.S. Pat. No. 3,116,949 issued Jan. 7, 1964 for "BOAT TRAILERS AND SHELTERS";

Behr — U.S. Pat. No. 3,118,552 issued Jan. 21, 1964 for "DUAL-PURPOSE TRAILER";

Hagen — U.S. Pat. No. 3,179,462, issued Apr. 20, 1965 for "EXPANDABLE TRAVEL TRAILER";

Rose — U.S. Pat. No. 3,193,321, issued July 6, 1965 for "MOBILE HOME AND BOAT COMBINATION";

Dale — U.S. Pat. No. 3,380,607, issued Apr. 30, 1968 for "TRANSPORT EQUIPMENT";

Howarth — U.S. Pat. No. 3,486,786, issued Dec. 30, 1969 for "COMBINATION CAMPER AND BOAT VEHICLE";

Ekstrom — 3,488,084, issued Jan. 6, 1970 for "TENT UNIT FOR BOAT TRAILERS";

Kallies — U.S. Pat. No. 3,550,947 issued Dec. 29, 1970 for "BOAT, TRAILER AND CAMPER COMBINATION"; and Voeller — U.S. Pat. No. 3,584,753, issued June 15, 1971 for "BOAT CARRYING KIT".

OBJECTS OF THE INVENTION

An object of the instant invention is to provide an improved trailer which includes facilities and equipment for both carrying and storing a boat of considerable size and equipment for camping out therewithin, the latter including multiple bunks, a table and storage cabinets.

Another object of the invention is to provide a camping trailer with novel removable means associated therewith which permits the transport of a boat within the trailer without loss of any utility in the camping function.

Another object of the invention is to provide a combined camping and boat carrying trailer, which trailer may be used to launch the boat into a body of water and retrieve the boat therefrom without damage to either the camping function or any of the facilities of the trailer.

Another object of the invention is to provide a combined boat carrying and camping trailer wherein, when one of the two trailer functions is being exercised (boat carrying or camping occupancy), the facilities and equipment for the other function are removed or withdrawn from the main enclosed space of the trailer, thereby to permit use of that full space for the particular function.

Another object of the invention is to provide a combined boat and camping trailer wherein the means for carrying and securing the boat within the trailer (which also serve in discharging the boat from the trailer and receiving the boat within the trailer) are completely adequate for handling and transporting a boat of considerable size, yet, when the boat is removed from the trailer, all of the occupancy and working space of the trailer is readily available for use without the boat carrying, securing and handling means in the way of such use.

Another object of the invention is to provide a combined boat carrying and camping trailer wherein the boat is received into and discharged from the rear end of the trailer, there being provided two additional access doors adjacent to and at the front end of the trailer, one for human ingress and egress when the rear doors are closed, and the other for access to the boat handling winch mounted within the trailer at the front end thereof.

Another object of the invention is to provide improved and novel sets of insertable and removable roller carrying frames, same removably floor positionable within an enclosed trailer for receiving a boat thereon, discharging a boat therefrom and carrying a boat secured thereon within the trailer.

Yet another object of the invention is to provide a trailer vehicle which is alternatively usable and adapted for use as a boat carrier, launcher and retriever, as well as a camper, the trailer itself extremely strong and well fitted to alternately perform both functions in a minimum volume of space, both the boat carrying and handling equipment and living apparatus rugged, long lived and durable under conditions of extreme use, the entire trailer and its accessory equipment of simple and relatively cheap construction, without sacrificing utility, ruggedness or durability.

Still another object of the invention is to provide a novel camping trailer of a construction wherein a boat of considerable size may be readily stored and received on the removable roller racks fixed to the floor of the house or camping trailer during travel, without any loss of living space within the trailer when the boat is removed therefrom.

Another object of the invention is to provide a novel camping trailer interior construction wherein beds and a table of rugged, comfortable and conveniently usable construction are provided, these facilities being readily pivoted out of the central living zone of the trailer for travel therewith, whereby a boat of considerable size may be securely received on removable roller frames secured within the trailer, a portion of the rear central floor of the trailer also removable to accomodate to the presence of an outboard motor on the boat.

Another object of the invention is to provide a combined camping and boat carrying trailer wherein all of the equipment and facilities for the camping function are arranged with a view to clearing the boat carrying space for travel, the means for carrying, receiving and discharging the boat, as well as securing the same in the trailer, being so positioned with respect to the interior space that a maximum sized boat may be received within and carried by the trailer without any loss of utility or storage space, means being provided by way of windows and doors arranged on the trailer so as to provide safety, security and all desirable and necessary access to the various parts of the trailer for handling the boat or moving in and out of the trailer.

Another object of the invention is to provide a novel trailer construction particularly adapted for the use of hunters, fishermen or sportsmen which provides not only usable and useful living accomodations, but also serves as a means to securely transport a boat of considerable size, thus providing in a single, unitary structure housing for a number of persons at the hunting, fishing or sporting location, as well as transport for the boat to the desired locality.

Another object of the invention is to provide an improved, multi-purpose trailer construction which is relatively inexpensive to manufacture, rugged and sturdy in construction and use, relatively compact in size and easy to handle behind a towing vehicle.

Another object of the invention is to provide an improved multi-purpose boat and camping trailer, the trailer requiring a minimum amount of apparatus or number of parts to provide both the boat handling, securing and carrying as well as camping functions, same being neat in appearance and so constructed that the boat carried thereby will be supported and secured strongly and safely and not suffer damage during transportation.

Other and further objects of the invention will appear in the course of the following description thereof.

In the drawings, which form a part of the instant specification and are to be read in conjunction therewith, an embodiment of the invention is shown and, in various views, like numerals are employed to indicate like parts.

DESCRIPTION OF THE DRAWINGS

FIG. 3 is a view taken along the lines 3—3 of FIG. 1 in the direction of the arrows, comprising a vertical plan view of the trailer shown in full lines, with a dotted line showing of a boat received therewith for transport.

FIG. 4 is an end view (looking from left to right in the view of FIGS. 1 and 3) of the subject boat and camping trailer with the rear doors open and a boat received and secured within the trailer shown in dotted lines. The details of the front end of the trailer (see FIG. 7) are omitted for clarity in the view.

FIG. 5 is a view like that of FIG. 4, but with the boat and roller assemblies removed and showing the camping fixtures pivoted down from their wall storage into use and operating position.

[FIGS. 1, 3 and 4 show the rear segment of the floor removed, while FIGS. 5 and 6 show the same in place and position.]

FIG. 6 is a vertical plan view like that of FIG. 3, but with the boat removed, as well as the roller carriers therefor, the camping and living facilities being shown pivoted downwardly into usable position and the rear floor segment installed as is the case in FIG. 5.

FIG. 7 is a view taken along the lines 7—7 of FIG. 3 in the direction of the arrows.

FIG. 8 is a view taken along the lines 8—8 of FIG. 5 in the direction of the arrows and comprises a fragmentary side sectional detail of the removable end floor section showing the said end floor section in place in full lines and a boat motor in dotted lines.

FIG. 10 is an enlarged, fragmentary, sectional detail of the rear, lateral multiple roller bracket in position on the floor of the trailer and ready to carry one of the bottom sides of a boat.

FIG. 11 is an enlarged, fragmentary detail of the front boat receiving roller in place on the trailer floor.

FIG. 12 is an enlarged, sectional detail of a plastic plug sealing and opening in the trailer floor (when any one of the roller plate assemblies of FIGS. 9–11, inclusive are removed from the floor).

DESCRIPTION OF THE INVENTION

Figure 1:
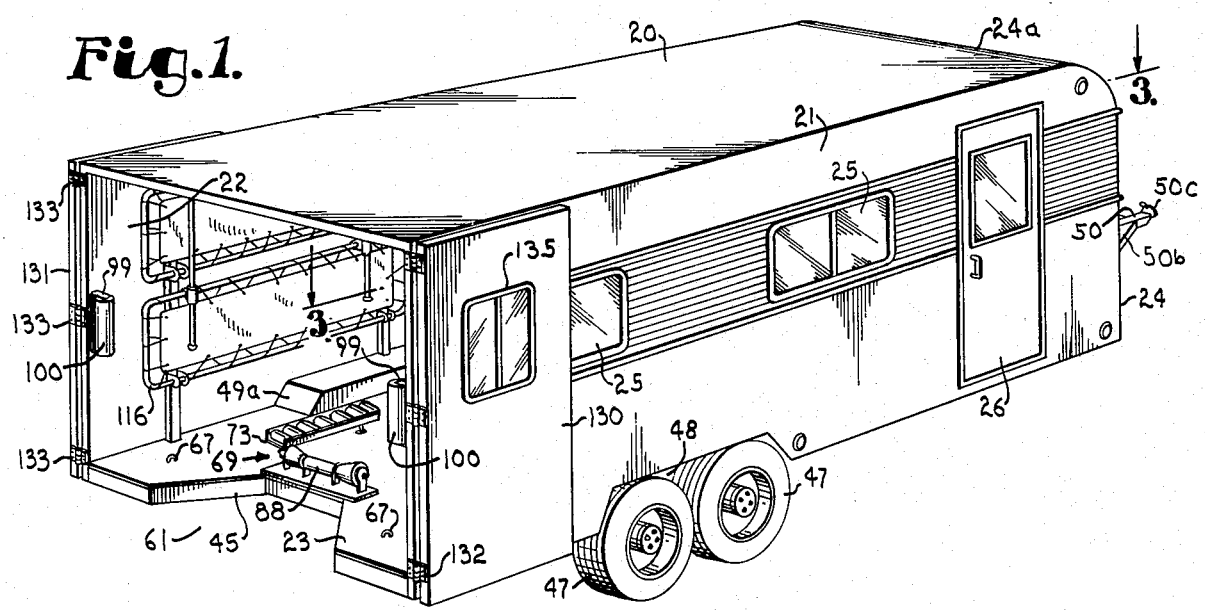
FIG. 1 is a three-quarter perspective view from above of the subject combined boat and camping trailer with the rear doors open, the camping bed and equipment frames retracted against the wall and the boat receiving roller members installed.

Referring to the drawings, therein is shown the combined camping and boat carrying trailer. The basic trailer comprises an elongate enclosed trailer body of substantially rectangular vertical side and end sections, as well as horizontal section. Conventional streamlining may be employed (such as is seen at the front end of the trailer in FIG. 1, to the right), as well as at the top edges of the side walls. However, in the interests of producing an economy construction, preferably, though not necessarily, the side walls connect at right angles to the floor and top wall.

The trailer body is formed of substantially rectangular, normally horizontal top wall 20 connected at its side edges to normally vertical side walls 21 and 22. The latter are connected at their lower edges to a normally horizontal floor generally designated 23. Top wall 20, side walls 21 and 22 and floor 23 are connected at their front edges to normally vertical front wall 24. As previously noted, the upper front junctures of the front wall 24 and side walls 21 and 22, as well as the front end of top wall 20 may be formed in a streamline curve, as seen in FIG. 1 at the upper right hand corner of the view, at 24a.

Windows 25 may be provided spaced along side walls 21 and 22. At least one side access door 26 is provided through either side wall 21 or 22, forward of the retractable camping and living equipment (to be described) and aft of the storage cabinets or shelves and boat handling winch at the front end of the inside of the trailer body, also to be described. There is also preferably provided a front access door (of lesser height and width than the side access door) in front wall 24 to one side of the center line of the trailer (longitudinal center axis) as at 27. This latter door is for access to the boat handling winch to be described.

Figure 2:
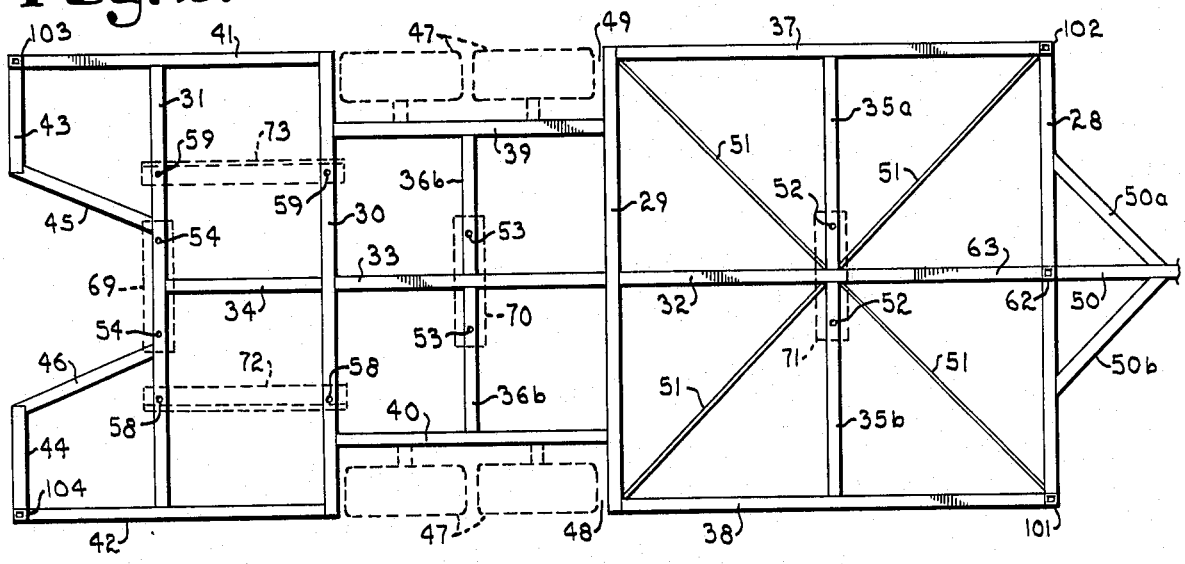
FIG. 2 is a plan view of the structural members of the trailer floor shown in full lines, with the positions of the boat carrying roller members shown in dotted lines, as well as the wheels.

FIG. 2 shows the arrangement of structural beams which not only support the floor 23 thereon, but also serve to carry the removable boat-receiving roller assemblies, as well as supporting the side and top walls of the trailer. Since this trailer is to serve a dual function, namely, that of a relatively large boat carrier and a house trailer on site, it is necessary that this structural framework be sufficiently strong and so configured as to be able to carry all of the loads applied thereto, including: the weight and structural parts of the trailer, per se; the weight and structural parts of the boat carrying apparatus; the weight of the boat and its associated equipment; the weight and attachments of the camping and living equipment to be described, and, finally, the necessary structural connections for the trailer wheel assembly and the drag or towing connection at the front end of the vehicle all to be described.

Accordingly, there are provided (FIG. 2) a plurality of main longitudinal structural members of beams (preferably hollow tubular sections or box beam members 28–31, inclusive. An single elongate central longitudinal beam member made up of individual sections 32, 33 and 34 interconnect beams 28 and 29, 29 and 30, and 30 and 31, respectively. Additional transverse structurals 35a and 35b connect centrally to central beam 32 and members 36a and 36b connect centrally to central beam 33. Side front longitudinal members 37 and 38 connect at their ends to transverse beams 28 and 29 and centrally thereof to the outer ends of transverse beams 28 and 29 and centrally thereof to the outer ends of transverse beams 35a and 35b. Intermediate inwardly positioned longitudinal beams 39 and 40 connect at their ends to transverse beams 29 and 30 and centrally thereof to the outer ends of transverse beams 36a and 36b. Rear longitudinal beams 41 and 42 connect at their front ends to transverse structural 30 and centrally thereof to transverse structural 31. At the rear end of rear longitudinal beams 41 and 42 there are provided short inwardly extending beams 43 and 44 which are connected by diagonal beam members 45 and 46 to transverse structural 31. All of the beam end and central constructions are rigid and of conventional type such as welding.

At least one wheel is employed on each side of the frame to carry the trailer body which is towed by a front end connection to a car or truck. Sets of paired wheels 47 are best employed as seen in FIGS. 1 and 2, the axles, bearings and the like therefor being of conventional construction (whereby not shown). Wheels 47 are thus carried in the recesses 48 and 49 intermediate the front and rear ends of the frame described. The floor 23 is raised and arched as at 48a and 49a to receive the wheels therewithin and lower the center of gravity of the entire trailer body. A front hitch or towing connection typically comprising an elongate central beam 50 welded or otherwise fixedly attached to the center of transverse beam 28 has diagonal connecting members 50a and 50b connected thereto for reenforcement. Any suitable conventional connecting member 50c (FIG. 1) is provided at the front end of beam 50 for connection to a vehicle mounted socket or ball member. Diagonal cross bracing 51 as seen between the corners of beams 28, 29, 37 and 38 may be provided at various points in the frame construction as needed or preferred.

Figures 9, 13:
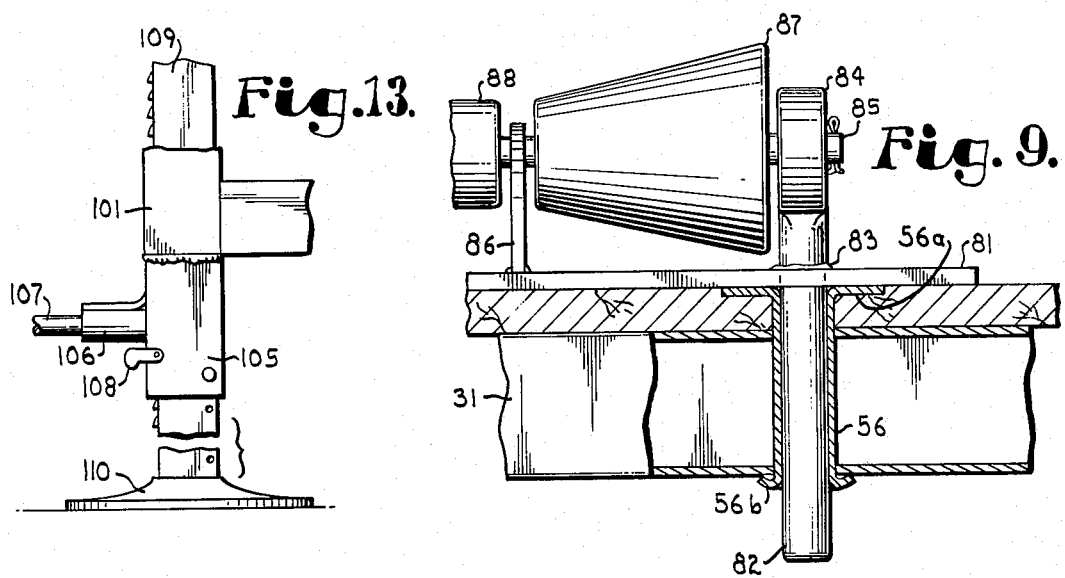
FIG. 9 is an enlarged fragmentary sectional detail of the roller plate assembly at the rear end of the trailer (visible in FIG. 1) in place and adapted to receive a boat thereon.
FIG. 13 is a fragmentary side view detailing the corner posts of the frame of FIG. 2 showing one of the built-in leveling jacks thereat (one on each corner).

A plurality of sets of openings or holes 52, 53 and 54 are provided centrally of transverse beam members 35a and 35b, 36a and 36b, and 31 spaced equidistant from the centers thereof or the center connections to beam members 32, 33 and 34. These openings or holes extend through floor 23 and entirely through the respective beam members and receive therewithin sleeves 55 (FIG. 11) or 56 (FIG. 9). FIG. 11 shows the front roller assembly, while FIG. 9 shows the intermediate and rear roller assemblies. Sleeves 55 and 56 are identical in configuration and comprise elongate hollow tubes having circumferential hollow centered discs 55a and 56a, respectively, integral with their upper ends which fit into recesses which may be provided in the floor 23 as seen in FIGS. 9 and 11 or lay flat thereon. Also seen in FIGS. 9 and 11, the bottom portions of sleeves 55 and 56 are outwardly turned as seen at 55b and 56b, whereby to securely fasten same in the floor. FIG. 12 shows removable plastic plugs 57 adapted to fit into the sleeves 55 or 56 when the roller assemblies are removed from their working positions engaging the floor and beams of the trailer.

There are also provided two sets of openings 58 and 59 (FIG. 2) laterally spaced from the centers of beams 30 and 31 adapted to receive the longitudinal roller racks to be described and seen in FIGS. 1, 3 and 10. Holes 58 and 59 also penetrate the floor and beams and receive sleeves 60 therewithin which are like configured to the sleeves 55 and 56 at 60a and 60b.

The rear center portion of the floor 23, seen at 23a in FIGS. 5, 6 and 8, is provided as an overlying section (overlying the portion of floor 23 over beams 45 and 46 and the center of beam 31) having, additionally, a downwardly depending flange 23b thereon (FIGS. 5 and 8). Flange 23b fits flush against the inner faces of beams 45 and 46 and the rear face of beam 31 centrally. A pair of downwardly depending, normally vertical pins or shafts 23c are adapted to fit into the holes 54 in beam 31 to maintain floor section 23a in position. When the member 23a is removed from its engagement overlying floor 23 with the pins 23c in the sockets 54, then there is provided a cut-away recess 61, seen in FIGS. 1, 3 and 4, adapted to permit the lower shaft and propeller assembly of an outboard motor or outdrive assembly mounted on the boat to extend downwardly thereinto and through the floors as seen in FIGS. 4 and 8.

Vertical side walls 21 and 22, as well as the front wall 24, incorporate conventional structural beams at each corner and typically on two foot centers so as to make the walls rigid and strong per se, and in their connection to the floor frame. One such vertical structural member 62 (FIG. 2) is located centrally of forward floor beam 28, to which is secured, at its forward end, downwardly angled beam 63 (FIGS. 2 and 7). Winch 64 (FIGS. 3 and 7) is mounted on beam 63 and has handle 65 which is positioned (the handle) next to door 27. Winch 64 has cable 64a carried thereby (FIG. 3) for attaching to the front cleat of a typical boat, generally designated 66 in the views. A pair of eyes 67 are rigidly fixed to floor 23 and are adapted to receive chains, cables or lines 68 which secure to the rear end boat hardware connectors or cleats, whereby to combine in securing the boat within the trailer with the winch cable connection at the front end thereof. (FIGS. 1, 4 and 5).

FIG. 3 shows in full lines the rear boat carrying roller assembly (generally designated) 69, the central assembly 70 and the forward roller mounting 71. The two rearwardly positioned lateral multi-roller assemblies are generally designated 72 and 73.

Referring first to FIG. 11, as well as FIG. 3, therein is detailed the forward (bow) boat receiving roller assembly comprising a rotatable roller unit 74 having a cylindrical section 74a of lesser, uniform diameter, and guiding portion 74b tapering to a greater diameter outer cylindrical portion 74c. While the roller configuration may be varied somewhat depending upon the hull configuration of the boat which is to be carried and handled, the configuration illustrated is optimal for receiving and centering the front end of the conventional boat hull thereon. Roller 74 is rotatably mounted on shaft 75, the latter rotatably received in and carried by bolsters 77 and fixed against lateral motion by cotter keys or other means. Bolsters 77 are integral with or fixed to elongate shafts 78 having intermediate portions 78a thereof externally threaded. Floor plate 79 has openings (not seen) therethrough, through which shaft portions 78a extend above. Nuts 80 are welded to plate 79 and engage the treaded portions 78a to precisely fix the height of bolsters 77 with respect to plate 79. The lower portions of shafts 78 removably fit down within sleeves 55b so that the entire assembly of plate 79, shafts 78, bolsters 77, shaft 75 and roller 74 may be inserted and removed from the front portion of the floor 23. Insertion of shaft 75 into bolsters 77 after shafts 78a are threaded into nuts 80 fixes the height adjustment.

The construction of center and rear roller assemblies 69 and 70 are the same, save for the fact they are positioned spaced longitudinally from one another so only the detail construction of assembly 69 will be described. Unit 69 is seen in each one of FIGS. 1, 9, 3 and 4.

Detailing the construction of roller assembly 69, plate 81 has a pair of openings, at 81a, therethrough whereby to receive vertical elongate non-threaded shaft 82 therethrough, same welded or otherwise fixed to plate 81 as at 83. Bolsters 84 are provided at the top thereof whereby to receive shaft 85 therethrough. Inboard of shaft 85 and bolsters 84 there are provided a pair of upstanding shaft mounting plates 86 which are rigidly fixed to the upper side of plate 81 by welding or other conventional means. Shaft 85 is rotatably received in plates 86, same rotatably thereon frustoconical outer rollers 87 and cylindrical central roller 88. Since elongate shafts 82 extend below plate 81, they removably slide into and fit into sleeves 56, whereby the entire assembly of plate 81, vertical shafts 82, rollers 87 and 88, etc. may be removably inserted in the deck holes or floor holes, as illustrated, to carry a boat, thereafter being removed for use of the trailer for camping purposes when the boat is removed from the trailer housing or body.

The parts of roller assembly 70 which are visible (FIG. 3) in the views are numbered the same as those parts in FIG. 9, but primed.

Referring to FIGS. 1, 3, 4 and particularly 10, therein are seen the laterally positioned roller racks 72 and 73 which comprise each an elongate U-section tray or trough 90 which carry therein a plurality of rotatable shafts 92 mounting rollers 93 thereon. Fixed to the underside of troughs 90 are a plurality of flanges 94 to which elongate externally threaded shafts 95 are fixed by bolts 96. The upper portions of shafts 95 at 95a may be U-form whereby to receive flanges 94 therebetween in adjustable fashion so that the angularity of the troughs 90 and thus the canting of the rollers 93 carried thereby can be adjusted to a given hull. The lower portion 95b of shafts 95 are externally threaded as seen. Locknut or nuts 98 are provided so that the position of the shaft with respect to circular plate 97 may be vertically adjusted, depending upon the configuration of the boat hull. The lower locknut is typically welded or otherwise fixedly attached to the upper surface of plate 97. The lower end of shafts 95 removably and slidably fit in the sleeves 60 through floor 23 so that the lateral roller racks 72 and 73 may be removably positioned in the openings 59 and 58 as seen in FIG. 2. The entire rack is supported by two shafts 95, one at each end thereof, each engaging a single circular plate 97. The double locknut is provided for fixed height adjustment. Cotter keys or retainers 91 fix shafts 92 against lateral movement.

As previously noted, FIG. 2 shows the positioning of the roller assemblies 69–73 both with respect to the floor and the structurals of the floor of the trailer body.

Finally, with respect to the roller assemblies for handling the receiving, discharging and positioning of the boat hull within the trailer body, there are provided U-frame mounts 99 (Per FIGS. 1, 3, 5 and 6) rotatably carrying rollers 100 on the rear portions of vertical side walls 21 and 22. Since it is contemplated that the trailer body be backed down a slope to a body of water carrying the boat, with the rear end of the trailer acutally being submergable, the rollers 100 guide the boat hull sides into the trailer body, drawn by the winch cable 64a which is connected initially to the front cleat at the bow of the boat.

Referring to FIG. 13, therein is shown a detail of one of the frame cornerposts showing a built-in leveling jack. One of these is provided on each corner. Referring to FIG. 2, at each of the four corners of the basic structural frame, there is provided an upstanding, vertical, hollow box beam 101, 102, 103 and 104, respectively. Same are rigidly fixed to the basic framing structurals 28, 37, 41, 43, 44, 42 and 38. Welded to the underside of each hollow beam 101–104, inclusive is an automobile jack body 105 having an operating arm sleeve 106 thereon, into which may be inserted lever bar 107. Such a jack body also has conventional lock lever 108. An elongate rachet bar 109 is provided for each jack body, same carried locked up inside thereof. Removable ground or floor plates 110 are carried in the trailer body and may be inserted on the lower ends of the ratchet bars 109 when same are lowered down out of the vertical box beams 101, etc. and jack bodies 105. In this manner, by adjusting the level of each corner, the trailer may be leveled and fixed in position for use as a camping trailer, after removal of the boat therefrom. A locking pin on a chain (not seen) may be provided through body 105 into openings in bar 109 to fix same in housing 105.

Turning now to the camping and living equipment provided with this dual purpose trailer, integral therewith, same is shown in the down and usable position in FIGS. 5 and 6, while shown in up, storage position in FIGS. 3 and 4. In the optimum size trailer (of definite, fixed, optimal dimensions to be described), there is provided three sets of double deck bunks, generally designated 111–113, inclusive, and a table 114. There is additionally provided at the front end of the trailer cabinet and storage space (FIG. 7) to be described.

Turning to the bunk frames, these comprise, each, upper and lower rectangular frames 115 and 116, respectively. Canvas or plastic sheets 117 are suspended or mounted within said frames by suitable laces or cords of rope or plastic 118 which are laced around the frames and through perforations in panels 117. Each of the frames 115 and 116 are mounted on two sets of hinges (hinge plates) which are fixed to vertical posts 120. Hinges 121 (hinge plates) are provided on the inboard (when down) portions of frames 115 and 116 carrying sleeves which are fixed to the vertical legs of U-frames 122. As may be seen from FIGS. 3–6, inclusive, each of the frames 115 and 116 pivot on their respective hinges 119 upwardly to wall storage in FIG. 4 and downwardly to operating position as in FIGS. 5 and 6, while the U-frames 122 pivot around their hinges 121 whereby to provide the inboard support for the cot or bed frames. Catches to secure the bunk frames (not shown) may be provided on walls 21 and 22 to secure the bunks to the wall in storage position.

Table 114 (FIGS. 3 and 6) is hinged at its outboard edge 114a with hinges 123 being fixed to vertical support posts 124 which are fixed to the inside surface of wall 22 of the trailer body. Paired hinge plates 125 pivotally mount table support legs 126 or hinge pins 127 to support the inboard edge of the table. A catch may also be provided to hold table 114 in up position on wall 22.

Turning to the storage zone at the front end of the trailer generally designated 128 (FIGS. 3 and 6), the front storage zone 128 is positioned immediately ahead of side door 26. There (FIG. 7) is provided three parts to the front storage zone. The upper part generally designated 128a may be either open shelving or closed storage cabinets preferably somewhat relieved over the front access door for more head room there. This is not necessary (the relief). A lower storage zone of greater width, 128b, is positioned spaced below the upper storage zone 128a and may possess cabinets and drawers as shown, in any desired arrangement. A smaller (lesser width) storage zone 128c may be provided on the other side of door 27. The intermediate zone 129 is preferably left clear to wall 24 in the case of transport and storage of a boat of extreme length whereby the prow of the boat may extend into the zone between the upper and lower cabinets.

In order to obtain the greatest utility from the instant dual purpose trailer, and particularly in order to be able to handle, carry and store a boat of large dimensions within the trailer, the entire rear end of the trailer is open for access for boat handling. This is enabled by providing a pair of doors 130 and 131 which is shown in both open (full lines) and closed (dotted lines) in FIG. 3 and open in FIG. 1. Door 130 is hinged at 132 to the side wall 21 with door 131 hinged to side wall 22 at 133. Any suitable conventional latch or closure 134 may be employed.

It should be understood that the primary usage of the rear full opening doors 130 and 131 is to give access for insertion and removal of the boat. When the trailer is used for camping and living purposes, these doors are generally locked and secured so that they will serve as a rear wall. For this purpose, the windows 135 may be provided in doors 130 and 131. On the other hand, side access door 26 is used primarily for ingress and egress for people when the trailer is used for camping and living purposes. Finally, the front door 27 is primarily used for access to the winch in boat handling.

The optimum dimensions for a trailer which will handle boats in the size range from 12 to 16 feet (which covers the optimum and largest number of outboard motor powered boats presently) and will additionally permit the two head to foot bunks, side access door and front storage (as well as winch) is a trailer which is 18 feet 6 inches long (in FIG. 2 18 feet 6 inches from beam 28 to beams 43 and 44 (outside distances)). The trailer width (from the outside of beam 37 and 41 to beams 38 and 42, respectively) is 8 feet. An additional two foot extension on the total length would handle 18 foot boats. Returning to the 18 foot 6 inch length, the distance on centers from openings 52 to openings 54 would be slightly over 12 feet. From beams 43 and 44 to beam 31, 2 feet 6 inches. From the former to beam 30, 5 feet 6 inches. From the former to beam 29, 10 feet 6 inches. The distance on centers from openings 58 to openings 59 (the side roller channels) would be approximately 48 inches.

More significant dimensions with respect to the optimum size vehicle described include bed lengths of 6 feet 6 inches × 2½ feet with table dimensions 3 × 7 feet. The side access door preferably has a width of 30 inches and a height of 6 feet. The table height is preferably 28 inches. The floor to ceiling height (inside the trailer) is adequate at 6 feet 6 inches and optimum at 7 feet. The front door preferably has a width of 24 inches and a height of 48 inches. In the event of a 2 feet increase in length for a larger boat, same would come at the rear end of the trailer herein shown and described.

As a specific example of a wood finish which is an adequate protective coating for the side walls and floor, I list "Wood-Kote" liquid plastic of the Spe-De-Way Products, Co., Inc. of Portland, Oreg. 97217. This polyurethane finish includes 49% by weight polyhydric alcohols partially esterified with linolenic, oleic, linoleic, palmitic, stearic acids and modified with tolylene diisocyanate and 50% aliphatic hydrocarbons and dryers. This may be applied by brush or spray. Two coats are a minimum, but three or more necessary when exposed to exterior weathering (as here).

In conjunction with this coating on the floor, it would also be preferable to apply non-skid adhesive backed strips on the floor, running parallel to the trailer sides the full length of the floor, spaced approximately 6 inches apart. This is because such a finish tends to be slippery when wet.

It is to be emphasized that the entire rear end or, alternatively (depending on the steepness of the incline for launching) the entire floor be submerged in order to float the boat being carried on the roller assemblies and secured by the winch out of the trailer. For this reason, the fold-up bunks illustrated are particularly useful as it well may be that the water level comes up to the lower bunk fittings 119 on a shallow incline for boat launching. Yet further, the type of boat hull also effects the required quantity of hull submergence for flotation out of the rollers. It is preferred that the entire side walls and floor be waterproofed. Any suitable wood preservative if marine plywood is employed, will serve. Fiberglass floor and side wall construction or aluminum floor construction is also useful. The requirement of submergence of a good portion of at least the rear portion of the trailer and often the entire floor is the reason for simplicity in the cots and tables.

With the instant combined boat carrying and camping trailer, a boat can be moved into and out of the water far easier than using the conventional, simple, frame boat trailer. That is, the boat owner has the floor of the trailer to stand on in manipulating the boat in or out of the trailer, not a slippery, wet steel frame or a slimy, slick stone or other material ramp. With this construction, the boat owner can physically drive the boat half way into the trailer (with the trailer floor partially or entirely submerged) onto the receiving roller members. It is not at all necessary to connect the front cleat or bollard with the hook on the cable leading to the winch and draw the boat into the trailer. That is, the boat is already part way in and engaged with the roller system before the cable attachment and winch drag need be applied.

It should be understood that the doors 130 and 131 are not the only door arrangement for the rear end of the trailer, only the most convenient. That is, any sort of conventional, rollup door or even a door which would be hinged on the top wall 20 and swing thereover could be employed. The double door arrangement shown with doors 130 and 131 hinged on the side walls 21 and 22 is the cheapest and most convenient for the described purposes, giving total access across the entire rear section of the trailer, with the doors out of the way of not only the boat handling operations (putting the boat in or out), but also with respect to the living space adjacent the rear of the trailer.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A combined camping and boat carrying trailer for full floor submersion boat launching and retrieval comprising, in combination:

an elongate, enclosed trailer body of substantially rectangular, vertical side and end section, as well as horizontal section, said body formed of substantially rectangular top, side and front end walls and an integral, flat floor joined at the ends thereof to one another, the size of the trailer in plan view only slightly greater in length and width than the length and width of the boat to be carried, the floor to ceiling height inside the trailer in excess of 6 feet, a towing connection at the front end of said vehicle, at least one pair of wheels carrying said body spaced intermediate the front and rear ends thereof, the rear end closed by a pair of doors hinged substantially at the rear ends of the side walls, whereby to provide unrestricted boat handling access to the interior of said body across the entire vertical section thereof, a plurality of boat receiving roller assemblies removably secured to said floor centrally thereof and spaced therealong, at least one pair of laterally positioned, boat receiving roller assemblies also removably secured to said floor, all of said roller assemblies sufficiently elevated above said floor so as to receive thereon, discharge therefrom and carry the boat upwardly of and free of the floor, a small, central rear portion of said floor removable to make way solely for the outdrive assembly for the boat and replaceable to complete the floor as an integral flat surface when the boat outdrive assembly is not present, winch means secured interiorly of said trailer body and positioned closely adjacent the trailer body front wall substantially centrally thereof and an access door through said front wall next to said winch for operation of said winch from exterior of the trailer and entry to and exit from the trailer body front end, storage cabinets positioned across the inside surface of the front wall substantially framing the access door and winch, living and camping equipment hingedly mounted on the interior of each side wall and pivotable within said trailer body from an "up" storage position on said walls and a "down" use position, and a side access door substantially 6 feet in height positioned in one side wall of said trailer forward of said living and camping equipment and immediately rearward of said storage cabinets, at least the entire floor and the lower portions of said side walls being of waterproof material, whereby the entire floor of said trailer and the lower portions of said side walls may be submerged in water in the processes of launching and receiving the boat on a body of water.

2. A combined camping and boat carrying trailer for full floor submersion boat launching and retrieval comprising, in combination:

an elongate, enclosed trailer body of substantially rectangular, vertical side and end section, as well as horizontal section, said body formed of substantially rectangular top, side and front end walls and an integral, flat floor joined at the ends thereof to one another, the size of the trailer in plan view only slightly greater in length and width than the length and width of the boat to be carried, a towing connection at the front end of said vehicle, at least one pair of wheels carrying said body spaced intermediate the front and rear ends thereof, the rear end closed by a pair of doors hinged substantially at the rear ends of the side walls, whereby to provide unrestricted boat handling access to the interior of said body across the entire vertical section thereof, a plurality of boat receiving roller assemblies removably secured to said floor centrally thereof and spaced therealong, at least one pair of laterally positioned, boat receiving roller assemblies also removably secured to said floor, all of said roller assemblies sufficiently elevated above said floor, so as to receive thereon, discharge therefrom and carry the boat upwardly of and free of the floor, a small, central rear portion of said floor removable to make way solely for the outdrive assembly for the boat and replaceable to complete the floor as an integral flat surface when the boat outdrive assembly is not present, and winch means secured interiorly of said trailer body and positioned closely adjacent the trailer body front wall substantially centrally thereof and an access door through said front wall next to said winch for operation of said winch from exterior of the trailer and entry to and exit from the trailer body front end, at least the entire floor and the lower portions of said side walls being of waterproof material, whereby the entire floor of said trailer and the lower portions of said side walls may be submerged in water in the processes of launching and reciving the boat on a body of water.

3. A trailer as in claim 2 including at least one vertically oriented roller on each side wall adjacent the rear end thereof and inside of the rear doors for guiding the boat hull into and out of the trailer body.

4. A trailer as in claim 2 wherein the floor is framed with longitudinal and transverse structurals connected to one another and the boat receiving central and lateral roller assemblies are mounted each in one or more of said structural members.

* * * * *